United States Patent [19]
Greene

[11] 3,975,912
[45] Aug. 24, 1976

[54] GEOTHERMAL DUAL ENERGY TRANSFER METHOD AND APPARATUS

[76] Inventor: Clarence Kirk Greene, 100 N. Arlington Ave., Reno, Nev. 89501

[22] Filed: Nov. 25, 1974

[21] Appl. No.: 526,856

[52] U.S. Cl. .................................. 60/641; 165/45
[51] Int. Cl.² ........................................ F02G 7/04
[58] Field of Search .................. 60/641; 165/45, 84

[56] References Cited
UNITED STATES PATENTS

| 3,295,596 | 1/1967 | Ostrofsky | 165/84 |
| 3,857,244 | 12/1974 | Faucette | 60/641 |

FOREIGN PATENTS OR APPLICATIONS

| 422,814 | 6/1947 | Italy | 165/45 |

*Primary Examiner*—Alan Cohan
*Attorney, Agent, or Firm*—Herbert C. Schulze

[57] ABSTRACT

This is a method, and apparatus for practicing the method, for the transfer of geothermal energy and for its use in the production of power, wherein an energy extractor is placed within each of two wells (or within each well of two groups of wells) in such manner that the steam created by a geothermal aquifer into which the well is drilled creates power by passing over the energy extractor in one well (or group) and the steam is further passed beyond the energy extractor within the well and brought out of the well for further power generation, and, in which the condensate returns to the aquifer through the second well, and, wherein a reversible flow arrangement is provided whereby the steam may be alternately taken from the second well (or group) and utilized, with the condensate going back to the first well (or group) in such manner that solids deposited within each well are alternately eliminated, and the heat of the aquifer is uniformly maintained.

8 Claims, 9 Drawing Figures

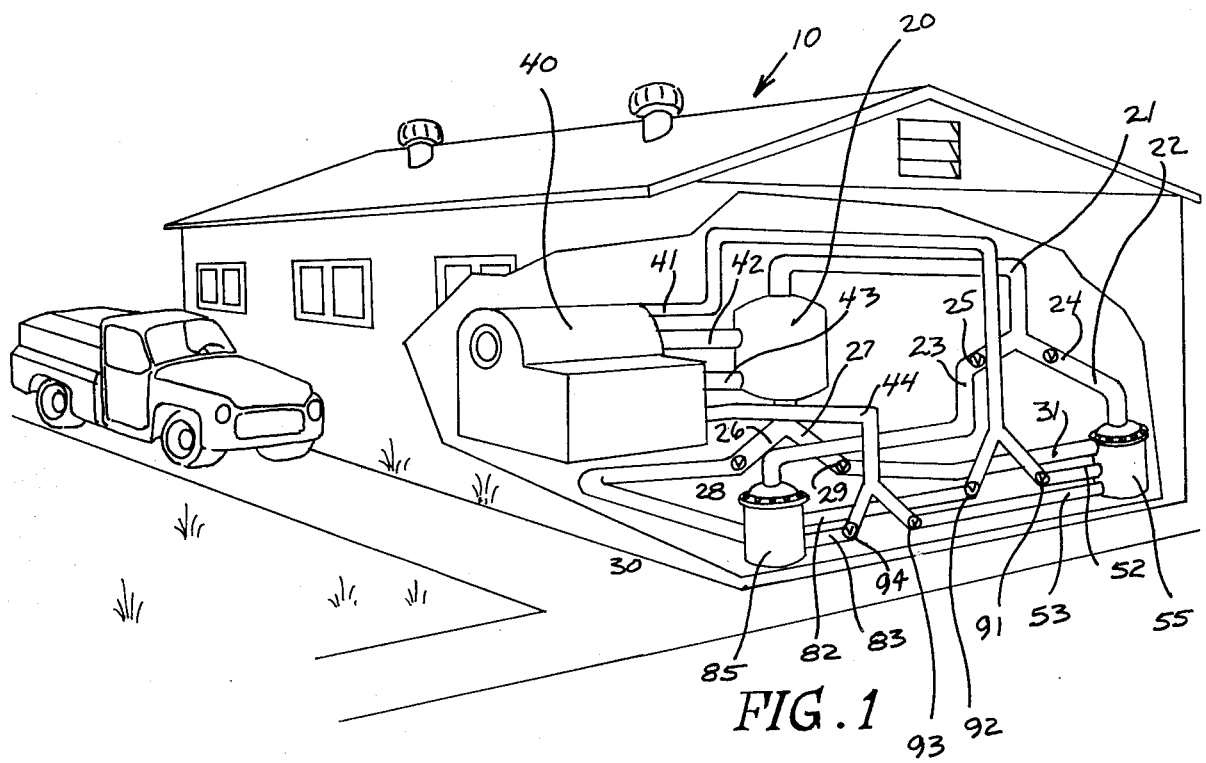
FIG. 1
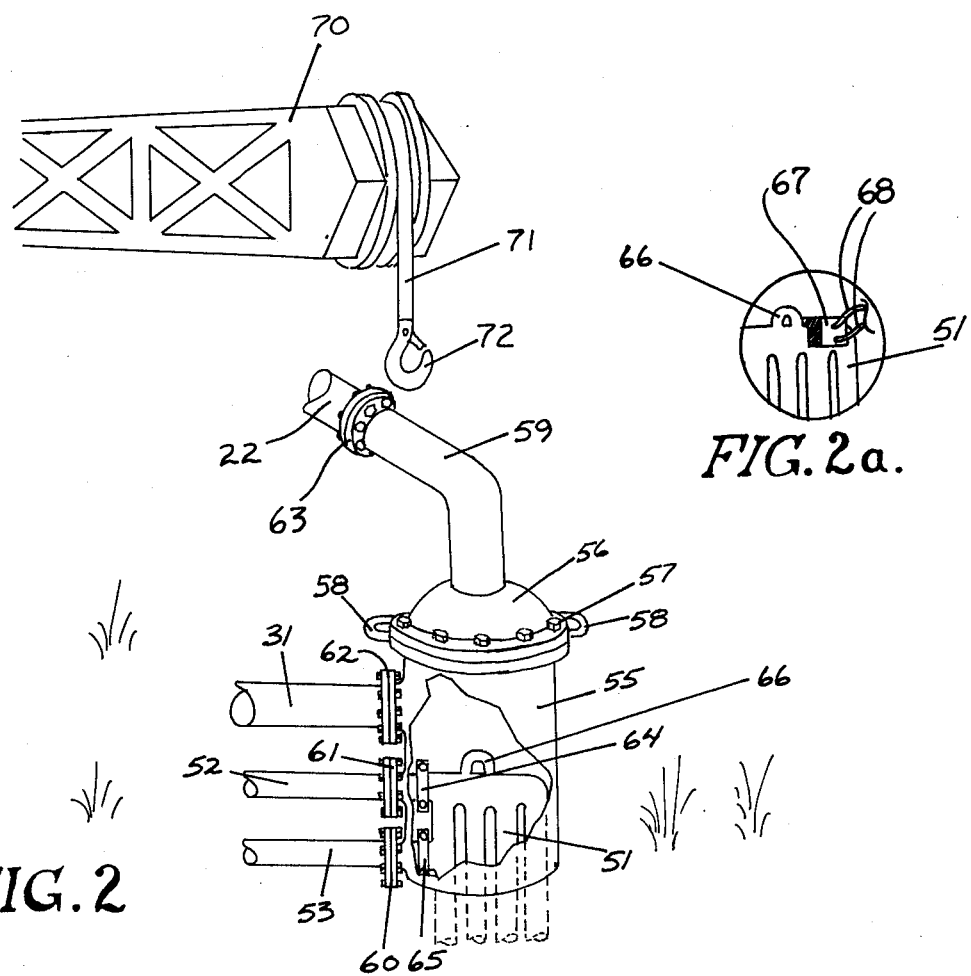
FIG. 2
FIG. 2a.

GEOTHERMAL DUAL ENERGY TRANSFER METHOD AND APPARATUS

CROSS REFERENCE TO RELATED PATENT APPLICATIONS

This patent application is related to my co-pending application Ser. No. 466,870, filed May 6, 1974, now U.S. Pat. No. 3,874,174.

This application is also related to my two applications for patent being filed concurrently herewith, entitled: GEOTHERMAL ENERGY UTILIZATION METHOD AND APPARATUS: and CYCLICAL ENERGY TRANSFER METHOD AND APPARATUS.

BACKGROUND OF THE INVENTION

1. Field of the Invention

This invention is in the general field of energy extraction, and more particularly in the field of energy extraction wherein the energy stored in hot brine or other liquid within the Earth is used to create power on the surface of the Earth.

The invention is more particularly in the field of such energy extraction and utilization of the stored energy wherein the hot liquid within the Earth is caused to vaporize and pass through a well casing to an energy extraction device on the surface of the Earth, with the condensate resulting therefrom being passed to an adjacent well with provision being provided for alternately receiving the steam and disposing of the condensate from one well or the other.

The invention is more particularly directed to the field of such energy extraction wherein an energy extractor is placed within each well and power is generated therein by steam passing past such energy extractor, and wherein the steam, in passing out of the well, is directly used in a turbine or other energy extractor apparatus, after which the ultimate condensate resulting therefrom is passed into the other well, with the alternate provision of disposing of the condensate back and forth between the wells, or groups of wells, 2. Description of the Prior Art It is well known, that there are pools of extremely hot liquids beneath the surface of the Earth. Generally, these pools of liquid are in the form of brine, at a considerable depth, and it has been heretofore known to pump such hot brine to the surface and utilize the hot brine for running turbines, or other such devices, in order to create power on the surface of the Earth. After the initial extraction of power from the hot brine, it is customary to return the same to the brine pool through an appropriate conduit or the like. One such system is illustrated in my co-pending patent application, Ser. No. 466,870, filed May 6, 1974, now U.S. Pat. No. 3,874,174.

It is also known to utilize steam, emanating from the surface of the Earth, through a well or the like, in a heat exchange device allowing condensate to return through the same well, or in some adjacent area or to otherwise dispose of it.

In the particular invention disclosed in this patent application, one well (or group of wells) is used for the source of steam; A separate well (or group) is used for the disposition of the condensate. Reversible valving arrangements are provided whereby the second well (or group) will become the source of the steam and the first well (or group) will receive the condensate. Further, the present invention utilizes a dual system, wherein an energy extractor is placed within each well to create a first source of power from the steam passing around such energy extractor; the steam is extracted, thereafter, from the well and is further utilized for power, directly, in a further energy extractor, or power producing, medium, after which it is returned as condensate to the other well. This is unknown and unique.

SUMMARY OF THE INVENTION

Those engaged in the generation of power and exploration of natural sources of energy have, for many years, known of, and studied, the extensive pools of extremely hot liquids at various locations beneath the surface of the Earth. In recent years, this study and the utilization of the energy stored in such pools of hot liquid have received increasing attention and utilization.

When the extremely hot liquids themselves are utilized directly, extreme problems of scaling, and the like, on the apparatus exist. My previously referenced co-pending patent application, Ser. No. 466,870, filed May 6, 1974, now U.S. Pat. No. 3,874,174, solves a great number of these problems in connection with the use of hot brine. Such systems, even that proposed in my said patent application, still have certain limitations, including, the limitation of necessity of pumps and the like.

Another approach to the utilization of the energy stored in the hot liquids beneath the surface of the Earth, has been to attempt to capture and utilize the steam which can escape from such pools of liquids. In this case, it is customary to drill a well and to allow steam to escape from the surface of the liquid through the well, and to channel it into an appropriate energy extracting unit on the surface of the Earth. The condensate resulting from the energy extracting unit, is either channeled back into the same well, or other uses or disposition may be made, including the diversion of the condensate back beneath the surface of the Earth. However, due to the extreme quantities of dissolved materials in the hot liquids beneath the surface of the Earth, any such operations have a very limited life, due to the clogging of the well by the deposition of the solids. Over a relatively long period of time, these solids may disappear if the well is capped and not utilized for energy extracting purposes.

While it is possible to use the steam wells in the manner presently known, and above briefly described, it is inefficient and ineffective, due to the necessity of cessation of operations for extended periods of time.

Since a great deal of the hot liquid, generally brine, existing in the sub-surface pools is formed by the heating of the liquid by the hot rocks, or other Earth formation deep beneath the Earth, the retention of such heat within the liquid at each well location is dependent upon proper and adequate circulation and contact of the liquids with the heating medium.

Another result of my new system of releasing steam from one well and receiving condensate into another well, with frequent reversal of the function of the wells is that appropriate circulation is maintained, and at no time is the energy level of the liquid allowed to become so low as to interfere with efficient conversion of energy. Thus, a pair of wells, or a group of wells, will continue to operate efficiently for longer periods of time.

I have devised a method and an apparatus for practicing the method, by which wells, in pairs, or in pairs of groups, may be operated continuously and very efficiently with a dual power extraction arrangement. In my method, I install energy extractors within each well, and I then utilize the steam from one well (or group of wells) and return the condensate, after use, through the second well (or group of wells). The energy extractor located within the well is utilized to generate power by being in contact with steam passing upward through the well and out through the top of the well. This generation of power may be independent, or may be used together to compliment the other generation of power. In any event, there is a first generation of power by passing through the energy extractor with the well, and a second generation of power by the steam passing through an energy extractor or by direct operation to a tubine, or the like, after passing from the well. The condensate from the steam passing from the well, after it is used, is passed into the second well and alternately the two wells are activated or deactivated as the case may be, such that the well receiving the condensate periodically will have salts, and the like, which have deposited therein removed by reason of the condensate dissolving and carrying such salts back to the aquifer.

In practicing my method, the alternating arrangement between the wells, or groups of wells, may be activated manually, based upon observation, or testing, determining the deposition of solids, or may be upon a predetermined and automatically activated time cycling basis.

When activated appropriately, and in either manner, the condensate, in returning through the well in which it is returning, will dissolve the solids and carry them back to the aquifer. Additionally, the condensate is thus dissipated through the aquifer by currents naturally existing, and additionally caused, through the transfer of heat from one well to the surface of the Earth, and returning as a cooled condensate through the other well.

It is an object of this invention effectively to extract energy from the heat of liquids beneath the surface of the Earth, through the utilization of steam flowing through an energy extractor by reason of the flow caused by condensation within the energy extractor circuit.

It is another object of this invention to provide a system for utilizing steam from adjacent wells, wherein reverse flow is achieved such that adjacent wells alternately dispense steam and receive condensate.

Another object of this invention is to provide a method such as described, whereby the condensate will cause dissolution of solids deposited in a well while giving up steam.

Another object of this invention is to provide a method such as described, with the additional utilization of a dual system of heat transfer, wherein there is a first energy extracting device within the well from which the steam is being utilized, and a second energy extracting device exterior of the well to be utilized by the steam after it passes in contact with the first said energy extracting device.

The foregoing, and other objects and advantages, will be understood by those skilled in the art upon reading the following description of a preferred embodiment in conjunction with the appended drawings.

BRIEF DESCRIPTION OF THE DRAWINGS

FIG. 1 is a perspective of a power generating station for practicing the method of this invention, with certain portions broken away and certain elements shown in schematic perspective representation;

FIG. 2 is a schematic perspective representation of the means for removing the energy extractor from within the wells;

FIG. 2-A is a schematic perspective representation of the attachment of a vibrator unit to the energy extractor;

DESCRIPTION OF A PREFERRED EMBODIMENT

Figure 3:
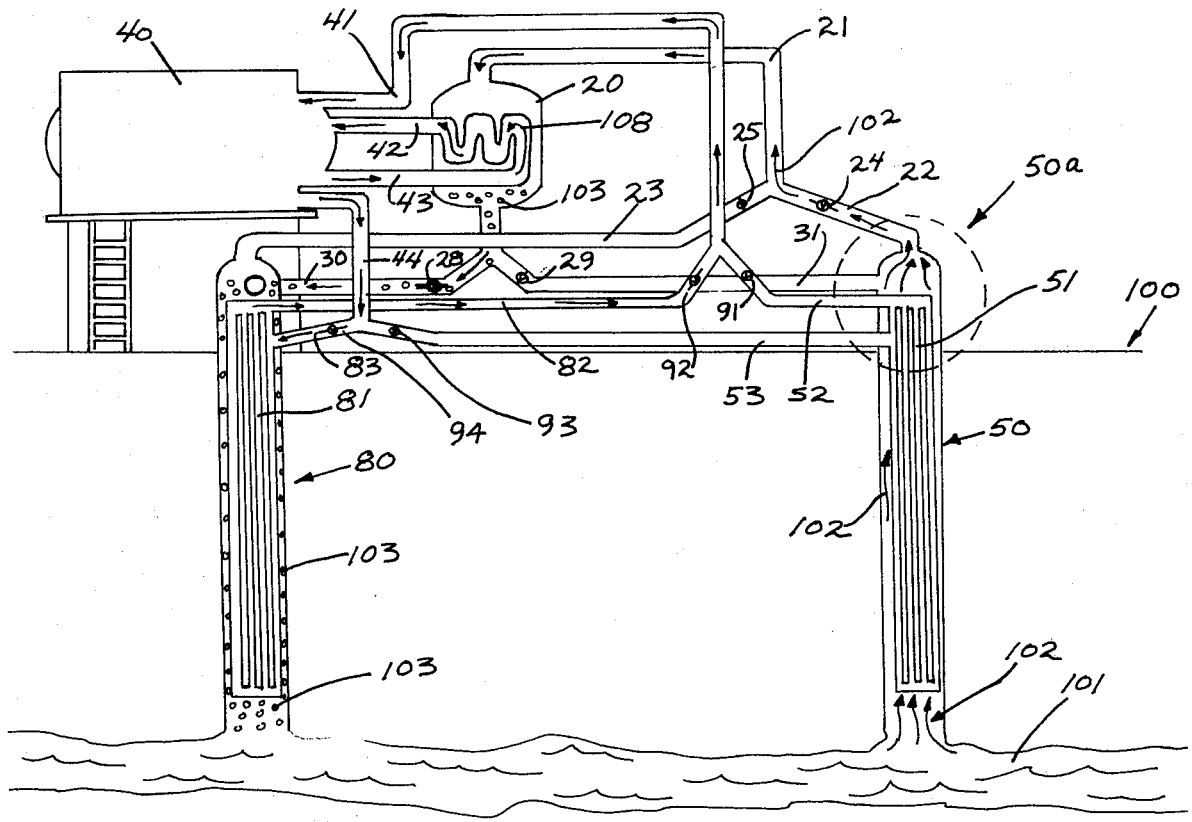
FIG. 3 is a schematic illustration of the energy producing elements utilized in the power station shown in FIG. 1.

FIG. 1 illustrates in a schematic perspective with parts broken away a typical power generating station utilizing the geothermal power of this invention. The station is indicated generally 10 which would be an appropriate building with proper equipment, machinery, and the like located therein. For the purposes of this invention the important elements are the power generating turbine or the like 40, the energy extractor, such as an heat exchange unit 20, the two well heads 55 and 85 respectively, together with appropriate piping 22, 31, 52, and 53 from well head 55 and 23, 30, 82, and 83.

The heat exchanger coil 108 (not shown in FIG. 1 but clear in FIGS. 3 and 4) is connected by conduits 44 and 43 to the turbine.

The remaining elements in this FIGURE will be clear to those skilled in the art, subject only to a brief explanation of valving 24, 25, 28, 29, 91, 92, 93, and 94. The workings of the valving will be better explained below and is therefore deferred.

FIG. 2 will be described briefly since it appears in next chronological order and is an important factor as a special arrangement is hereby made for removing a special heat exchange coil (the energy extractor) arrangement from the wells.

One typical well casing 55 at its upper extremity is illustrated in FIG. 2. There is a cap 56 appropriately held in place upon the head 55 by bolts or the like 57 as will be clear to those skilled in the art. A pair of handles 58 provided on the cap 56 for removing the same as desired. The cap 56 is provided with an outlet pipe 59 and this is connected by a flange arrangement 63 to heat exchange duct 22.

Other ducting, which will be explained in more detail below 52, 53, and 31 is connected appropriately by flanges 60, 61, and 62 to the head 55 of the well casing.

Flanges 64 and 65 connect heat exchange coil unit 51 as indicated, in such manner that heat exchange coil unit 51 may be removed by the hook 66 being engaged with hook 72 on cable 71 activated by special winch boom 70. It will easily be understood by those skilled in the art that the hook 72 will be dropped into position when the cap 56 has been removed and when the flanges 64 and 65 have been removed that the entire unit 51 can be lifted by the winch arrangement 70.

FIG. 3 shows in somewhat more detail the piping arrangements and the like of this device. Well 50 has inserted therein a heat exchange coil arrangement 51 which is removable by the means described in connection with FIG. 2. The piping 52 and 53 connects the heat exchange unit 51 to the various heat exchange ducting as indicated. The portion of the upper part of well 50 indicated in the dotted circle, generally as 50A gives that portion shown in FIG. 2.

It will be observed that the well 50 intersects the hot aquifer 101 beneath the surface of the Earth, as does the well 80. It will be observed that steam 102 passes upward through well 50 in the manner indicated and into primary energy extractor unit 20. This passage takes place through the ducting 22 and 21 as indicated and through the valve 24 which is opened at this stage. The steam is prevented from passing through duct 31 by the valve 29. Likewise the steam is prevented from entering ducting 23 by valve 25. During this phase of operation, there is no passage of steam from heat exchange 51 located within the well, since this is blocked by valves 91 and 93.

At the same time, it will be noted that there is no passage of steam from well 80 since well 80 is receiving the condensate from the energy extractor. Unit 81 located within the well is active, passing steam or hot water through valve 92 and the associated ducting into energy extractor 40 as indicated. The condensate from this activity returns as indicated through valves 94 in the energy extractor unit 81 and enhances the flow.

The condensate from energy extractor unit 20 is indicated by the number 103 and is seen to return through well 80 and back into the aquifer. It continues to lose heat and energy by passing through well 80 and about the exterior portions of energy extractor unit 81.

Figure 4:
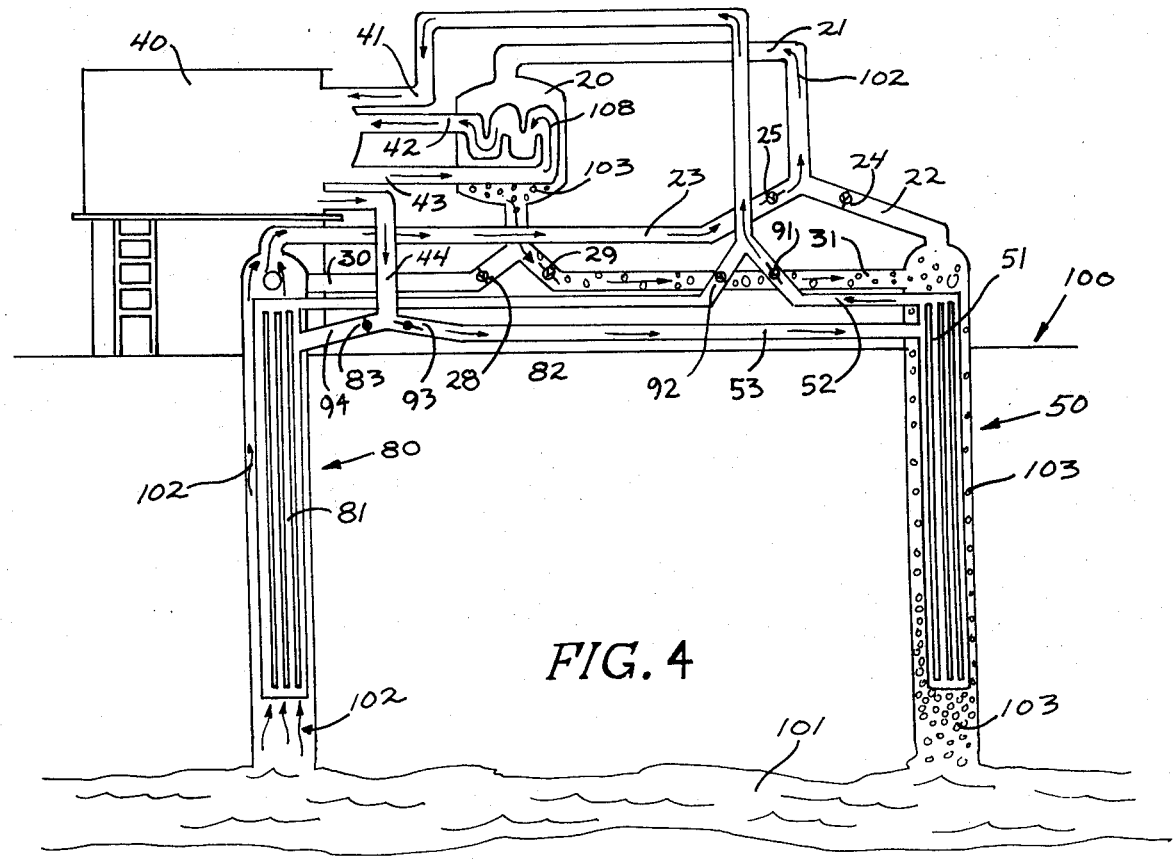
FIG. 4 is the same as FIG. 3 with the valving in the alternate mode for alternate operation of the wells.

At an appropriate interval, the valving is reversed and the full conditions are there indicated on FIG. 4. At this point, well 50 is receiving the condensate and well 80 is dispensing the steam. No further explanation will be given, since the reverse functioning is clear and the position of the valves indicates the flow arrangement available.

Figure 5:
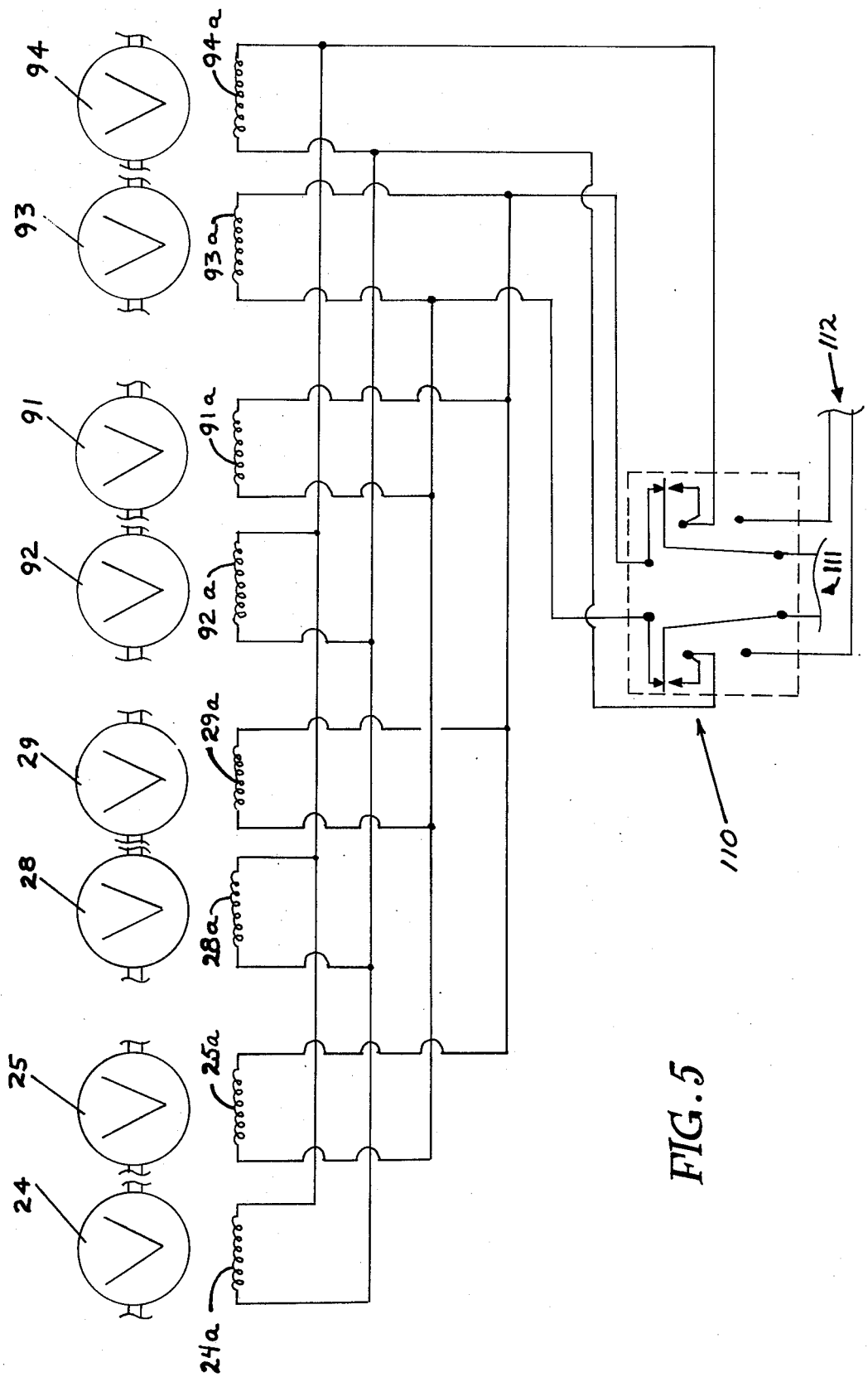
FIG. 5 is a schematic diagram of the electrical activation of the valving.

FIG. 5 illustrates one typical valving and timing arrangement. Each of the valves is numbered as indicated and thus it will be seen that the valves operate in pairs. When valve 24 is open valve 25 will be closed, when valve 28 is open valve 29 will be closed, when valve 92 is open valve 91 will be closed, and when valve 93 is open valve 94 will be closed. Obviously the reverse will hold true, and it will be seen that 24, 28, 92, and 93 will always be open together or closed together and 25, 29, 91 and 94 will be open together or closed together as the case may be. This arrangement may be preferably activated by use of a timer 110 of customary construction having power input at 111 and timer activated power at 112. It will thus be clear to those skilled in the art that when the timer activates on repeated cycles alternately valves in sets as previously described will change position from closed to open.

FIG. 2-A shows an alternate and/or additional embodiment and feature wherein the energy extractor unit 51 is shown to have attached thereto a vibrator 67 having electrical means or the like 68 to activate the same. The details of construction of a vibrator unit are well known to those skilled in the art, and no details have been shown. This might be, for example, a solenoid running on a half-wave, or it might be an eccentric ball arrangement activated by compressed air, or it might an eccentric weight activated by a small electrical motor. The details of construction of various types of vibrators are well known, and this is not of importance. The importance here is the application of a vibrator unit to a well mounted heat exchange or energy exchange device, wherein the scaling which will normally occur upon such items may be removed by the activation of vibrations or other vibratory wave action being transmitted to the energy extractor.

Figure 6:
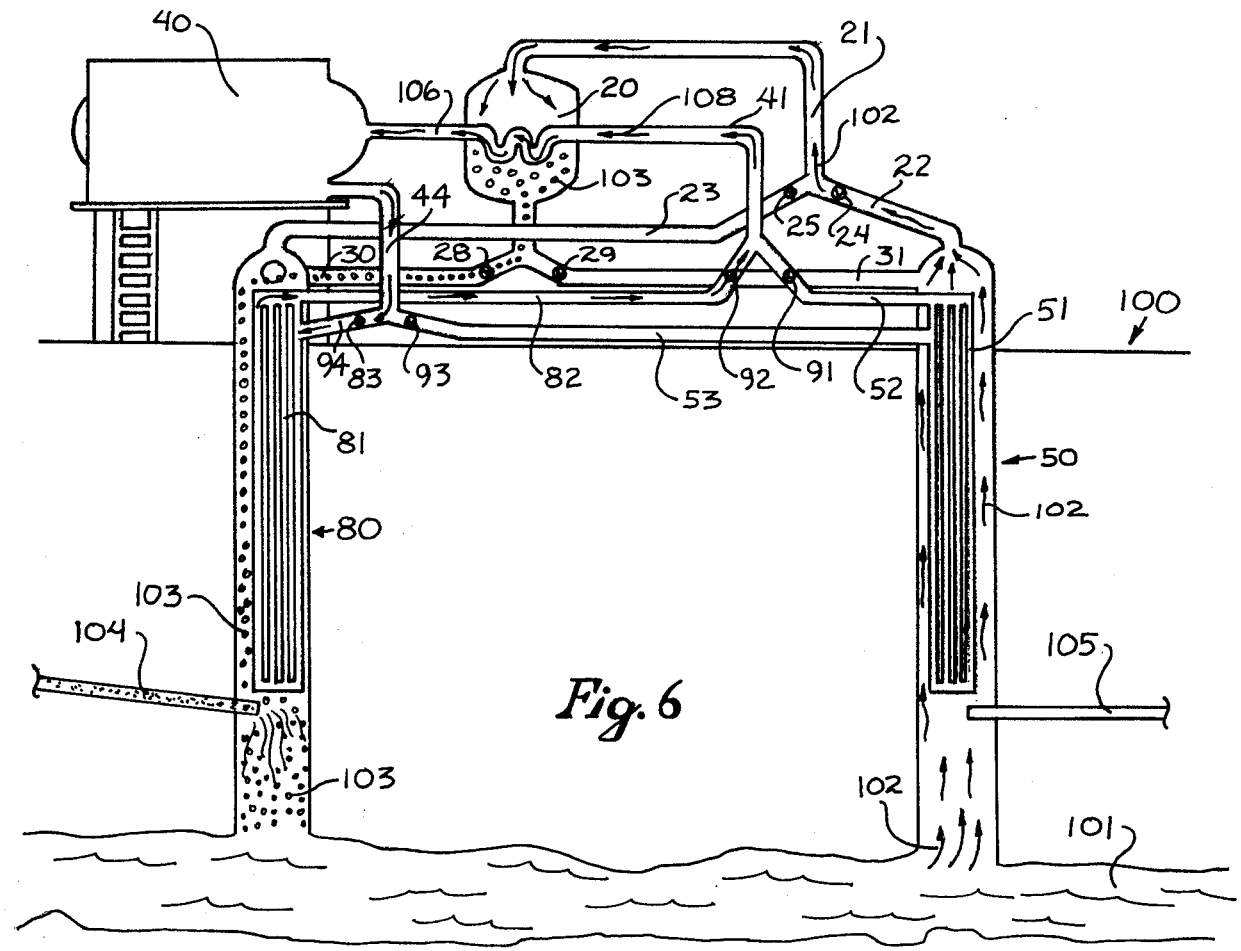
FIG. 6 is a schematic representation of an alternate embodiment of the energy producing elements illustrated in FIG. 3.
Figure 7:
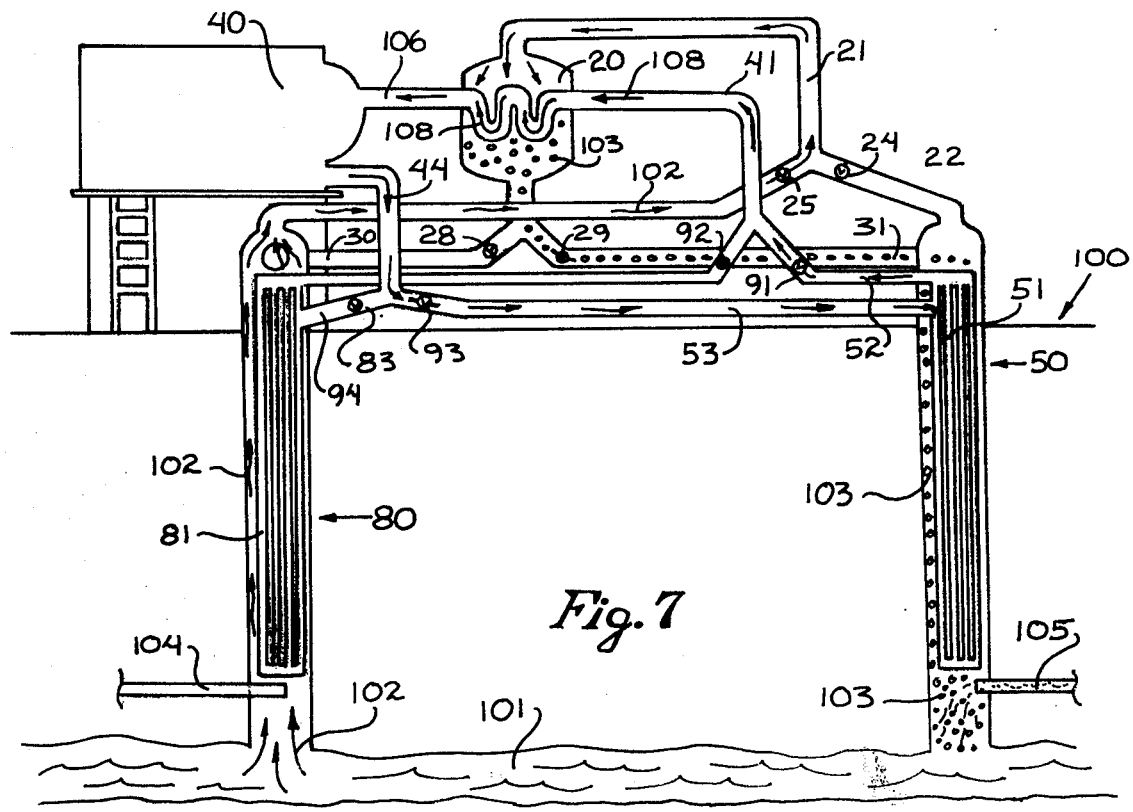
FIG. 7 is the same as FIG. 3 with the valving in the alternate mode for alternate operation of the wells.

With particular attention given to FIG. 6 and FIG. 7, some minor differences in the system of FIGS. 3 and 4 will be shown.

The description of the majority of the various elements as has already been described in connection with FIGS. 3 and 4 will not be repeated since these elements are all the same. The different features are limited to the direct connection from line 41 to the heat exchange coil as illustrated and the continuing direct connection by line 106 directly into the turbine or the like 40, with the elimination of elements 42 and 43 which were shown on FIGS. 3 and 4. Additionally, pipe lines, or the like, 104 and 105 enter the wells beneath the energy extractors 81 and 51 as illustrated. These pipes will be connected appropriately to sources of cooler water (such as surface drain water) by means known to those skilled in the art so that cold water may enter the particular well receiving the condensate as illustrated, so as to enhance the cooling thereof and thus the suction effect which promotes the flow from the other well.

By operating in the means shown in FIG. 6 and FIG. 7, the initially hot material from the heat supply elements 51 and 81 respectively in FIGS. 6 and 7 will be further heated by the action of the direct flow about it from the particular well utilized as illustrated in both of these FIGURES.

Figure 8:
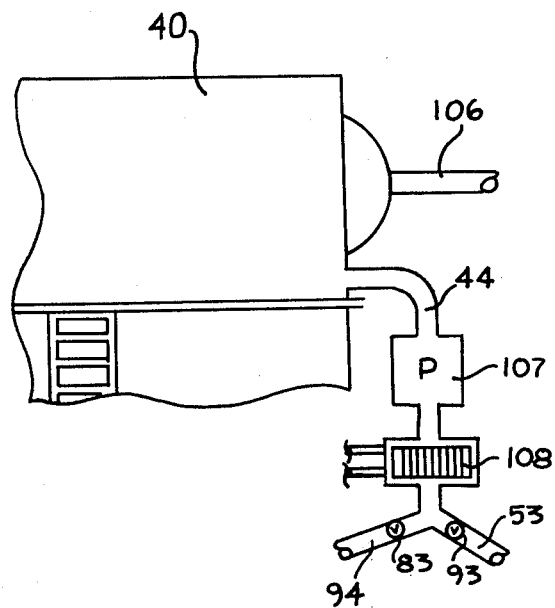
FIG. 8 is an enlarged partial view on a portion of FIG. 7.

FIG. 8 illustrates one further alternate embodiment which may be employed. It is seen that line 44 has inserted therein a pump 107 and a condenser 108 prior to its juncture with lines 93 and 94.

The operation of a pump and condenser of this nature are known to those skilled in the art, and it is obvious that in this configuration the pump will enhance the flow and the condenser will enhance the condensation and thus the activation of the overall system as will again be understood by those skilled in the art.

Throughout this description referene has been made to energy extraction which is the correct and broadest application. Energy extractors may take many forms as will be known to those skilled in the art, although in general throughout this application heat exchangers have been indicated for the energy extractors. A heat exchanger is an excellent form for extracting energy and the operation of heat exchangers is known to those skilled in the art and is therefore not detailed. However, it is to be understood that there is no limitation to be implied by the use of heat exchangers but merely the showing of one preferred method for extracting the energy.

While the embodiment of this invention shown and described is fully capable of achieving the objects and advantages desired, it is to be understood that the embodiment shown is for purposes of illustration and not for purposes of limitation.

I claim:

1. The method of extracting energy from heated liquids beneath the surface of the Earth comprising the following steps:
   1. providing at least two wells from the surface of the Earth intersecting a hot liquid pool beneath the surface of the Earth;
   2. inserting a first energy exchange device within the first of said wells;
   3. inserting a second energy exchange device within the second of said wells;
   4. circulating hot fluid from the hot liquid pool through the first of said wells upward, therethrough, and into a first energy conversion device located on the surface of the Earth;
   5. returning effluent from said first energy conversion device to the hot liquid pool by passing such effluent through the second well and about the second energy exchange device within said well;
   6. passing energy generated within the said second energy exchange device through a second energy conversion device located upon the surface of the Earth;
   7. passing the effluent from said second energy conversion device back into the said second energy exchange device located within said second well.

2. The method of claim 1 in which periodically the fluid is passed to the second well with the effluent returning to the first well, and simultaneously the first energy exchange device located within the first well is activated by the effluent.

3. The method of claim 1 in which there is at least one additional well which functions in the same manner as the first well.

4. The method of claim 2 in which there is always at least one additional well connected to the second well during its steam producing cycle.

5. Apparatus for extracting energy from hot aquifers beneath the surface of the Earth comprising the combination with such hot aquifer of:
   1. a plurality of wells extending from the surface of the Earth and intersecting said hot aquifer;
   2. an energy exchange device located within each of said wells;
   3. means connected to each of said wells to allow said wells to be interconnected alternately to the intake or discharge of a surface mounted energy conversion device;
   4. means connected to each of said energy exchange devices located within each well to enable each of the same to be interconnected to a second surface mounted energy conversion device;
   5. means connected with each of said well mounted energy exchange devices for removal of the same therefrom;
   6. means external to said wells to engage with the means for removal of said well mounted energy exchange devices for effecting such removal.

6. The device of claim 5 wherein means are provided to cyclically exchange the function of each of said wells so that at some times such well is dispensing steam into the surface mounted energy conversion device and at other times receiving effluent from the same.

7. The method of claim 1 wherein fluid is passed from the surface of the Earth into the said well at a point in said well beneath said second energy exchange device.

8. The method of claim 1 wherein the effluent from said second energy conversion device is condensed upon passing from said second energy conversion device.

* * * * *